US009701928B2

(12) United States Patent
Hill et al.

(10) Patent No.: US 9,701,928 B2
(45) **Date of Patent: *Jul. 11, 2017**

(54) REMEDIAL COMPOSITION AND TREATMENT METHOD

(71) Applicant: Agape Patent Holdings, LLC, Walterboro, SC (US)

(72) Inventors: Robert E. Hill, Richardson, TX (US); Timothy Ross, Walterboro, SC (US)

(73) Assignee: Agape Patent Holdings, LLC, Walterboro, SC (US)

(*) Notice: Subject to any disclaimer, the term of this patent is extended or adjusted under 35 U.S.C. 154(b) by 0 days.

This patent is subject to a terminal disclaimer.

(21) Appl. No.: 14/463,443

(22) Filed: Aug. 19, 2014

(65) Prior Publication Data

US 2015/0076424 A1 Mar. 19, 2015

Related U.S. Application Data

(63) Continuation of application No. 13/374,109, filed on Dec. 12, 2011, now Pat. No. 8,809,245.

(Continued)

(51) Int. Cl.

| | |
|---|---|
| ***C11D 3/08*** | (2006.01) |
| ***C11D 3/00*** | (2006.01) |
| ***C11D 3/20*** | (2006.01) |
| ***C11D 3/22*** | (2006.01) |
| ***B09C 1/08*** | (2006.01) |

(Continued)

(52) U.S. Cl.

CPC .................. *C11D 3/08* (2013.01); *B09C 1/08* (2013.01); *C09K 21/06* (2013.01); *C11D 3/0031* (2013.01); *C11D 3/2041* (2013.01); *C11D 3/2048* (2013.01); *C11D 3/2065* (2013.01); *C11D 3/2068* (2013.01); *C11D 3/221* (2013.01);

(Continued)

(58) Field of Classification Search

CPC ......... C11D 3/08; C11D 7/14; C11D 11/0041; C11D 11/0023; C11D 3/2065

See application file for complete search history.

(56) References Cited

U.S. PATENT DOCUMENTS

| | | | | |
|---|---|---|---|---|
| 4,374,743 A * | 2/1983 | Stockel .................. | C09K 3/185 106/13 |
| 5,431,847 A | 7/1995 | Winston et al. | |

(Continued)

*Primary Examiner* — Gregory Webb

(74) *Attorney, Agent, or Firm* — Scott T. Griggs; Griggs Bergen LLP

(57) ABSTRACT

A remedial composition comprising a soluble silicate, a surfactant, a polyol and water is disclosed. The remedial composition of the present invention is generally intended for use in the treatment of soil, sand, water, fly ash and other mediums that may contain hazardous materials. In one embodiment of the present invention the soluble silicate of the remedial composition has a mole ratio of about 2.6 to about 3.9 moles silicate per mole of alkali metal oxide. In another embodiment of the present invention the remedial composition will have a pH level ranging from about 10.5 to about 11.9. In another embodiment the water component further comprises from about 0.5% to about 15% dissolved oxygen ($O_2$). In another embodiment of the present invention the remedial composition may be further diluted by adding water to create various solutions comprising about 1 to 300 parts water to 1 part remedial composition.

18 Claims, 6 Drawing Sheets

TPH ppm Initial, 24 hours , 21 days 1600
1400
1200
1000
800
600
400
200
0

1376
413
41

Related U.S. Application Data

(60) Provisional application No. 61/459,543, filed on Dec. 14, 2010.

(51) Int. Cl.
*C09K 21/06* (2006.01)
*C11D 7/14* (2006.01)
*C11D 11/00* (2006.01)

(52) U.S. Cl.
CPC ............ *C11D 7/14* (2013.01); *C11D 11/0023* (2013.01); *C11D 11/0041* (2013.01)

(56) References Cited

U.S. PATENT DOCUMENTS

| | | | | |
|---|---|---|---|---|
| 8,809,245 | B2 * | 8/2014 | Hill | C11D 3/0031<br>510/110 |
| 2009/0245939 | A1 * | 10/2009 | Burns | B09C 1/08<br>405/128.75 |
| 2009/0311136 | A1 | 12/2009 | Manning et al. | |
| 2010/0197558 | A1 * | 8/2010 | Miralles | C11D 3/044<br>510/488 |
| 2011/0220155 | A1 | 9/2011 | Man et al. | |

* cited by examiner

REMEDIAL COMPOSITION AND TREATMENT METHOD

PRIORITY STATEMENT & CROSS-REFERENCE TO RELATED APPLICATIONS

This application is a continuation of co-pending U.S. patent application Ser. No. 13/374,109, which was filed on Dec. 12, 2011 in the names of Robert E. Hill and Timothy Ross and entitled "Remedial Composition and Treatment Method;" which claims priority from U.S. Patent Application No. 61/459,543, which was filed on Dec. 14, 2010 in the names of Robert E. Hill and Timothy Ross and entitled "Remedial Composition and Treatment Method;" both of which are incorporated by reference for all purposes.

TECHNICAL FIELD OF THE INVENTION

The present invention relates to a remedial composition and treatment methods for a variety of applications. More specifically, the present invention relates to a pollution remedial composition comprising a soluble silicate, a surfactant, a polyol, and water.

BACKGROUND OF THE INVENTION

As the world has become more environmentally conscious, it has become increasingly apparent that there is a need for pollution remedial compositions and treatment methods that may be utilized in the clean-up of soil, sand, water, fly ash and other mediums which may contain hazardous materials. Such hazardous materials may include various pollutants like hydrocarbons, heavy metals, pesticides, herbicides and animal waste. Many of these pollutants cannot be simply buried or dumped without presenting a significant health threat to humans and wildlife. These pollutants may often break down or leach out of the soil, landfills or other mediums in which they have been deposited and into the ground water thus contaminating drinking water and endangering fish and other wildlife many miles away from the actual dump site.

Hydrocarbons including petroleum-derived motor fuels, lubricants, and solvents are indispensable in the modern world. Unfortunately, hydrocarbon waste materials are quite common and present a significant health risk if disposed of improperly. One particularly dangerous category of these pollutants is that of chlorinated hydrocarbons that have been used in degreasers, paint thinners and dry cleaning solvents. Another form of chlorinated hydrocarbon is that of polychlorinated biphenyls (PCB) commonly used to insulate electrical equipment such as transformers and capacitors. Chlorinated hydrocarbons are particularly dangerous when burned and may form byproducts including dioxin, phosgene and hydrochloric acid.

Common heavy metal pollutants include lead, cadmium, chromium and mercury. Heavy metals are naturally occurring materials, but are often concentrated to highly toxic levels by various industrial activities such as mining, smelting and refining. These metals are also commonly found in products like batteries, circuit boards, and other electronic devices. It is not possible to further degrade basic elements such as these. Heavy metals are particularly hazardous under conditions where these pollutants may be acted upon by water, especially acid rain, and leached from the soil and into a water table. Accordingly, it would be desirable to remediate these materials by chemically binding to them in such a way as to render them essentially non-bioavailable, non-mobile, and far less susceptible to leaching from soil.

Pesticides and herbicides are useful in the production of food crops and the control of insect populations, but these pollutants degrade quite slowly and may also be toxic to humans and wildlife. Similarly, modern animal husbandry has permitted the production of eggs and meat on a large scale, but the animal waste products may be extremely high in metals such as copper and zinc, as well as various organic compounds including certain phosphates that need to be disposed of as pollutants.

Accordingly, there is a need for a remedial composition and treatment method for soil, sand, water, fly ash and other mediums that may contain hazardous waste materials. There is an urgent need for a remedial composition for the economical and effective cleanup and containment of a broad spectrum of pollutants including hydrocarbons, heavy metals, pesticides, herbicides and animal waste.

SUMMARY OF THE INVENTION

The remedial composition of the present invention is generally intended for use in the treatment of soil, sand, water, fly ash and other mediums that may contain hazardous materials. In a number of exemplary embodiments of the present invention a remedial composition comprising a soluble silicate, a surfactant, a polyol and water is disclosed. In one embodiment of the present invention the soluble silicate of the remedial composition has a mole ratio of about 2.6 to about 3.9 moles of silicate per mole of alkali metal oxide. In another embodiment of the present invention the remedial composition will have a pH level ranging from about 10.5 to about 11.9. In yet another embodiment of the present invention the water of the remedial composition further comprises from about 0.5% to about 15% dissolved oxygen ($O_2$). In an additional embodiment of the present invention the remedial composition further comprises one or more of the following additives selected from sodium chloride (NaCl), potassium chloride (KCl), magnesium chloride ($MgCl_2$), calcium chloride ($CaCl_2$), hydrogen peroxide ($H_2O_2$), citric acid, capsicum, thymol, oil of oregano, oil of peppermint, and oil of eucalyptus. In another embodiment of the present invention the remedial composition will be utilized as a cleaning concentrate which may be further diluted by adding water to create useful solutions having a ratios ranging from about 1 part water to 1 part remedial composition up to and including about 300 parts water to 1 part remedial composition.

BRIEF DESCRIPTION OF THE DRAWINGS

The present invention will be better understood in view of the detailed description in conjunction with the following figures and in which.

DETAILED DESCRIPTION OF THE INVENTION

Figure 1:
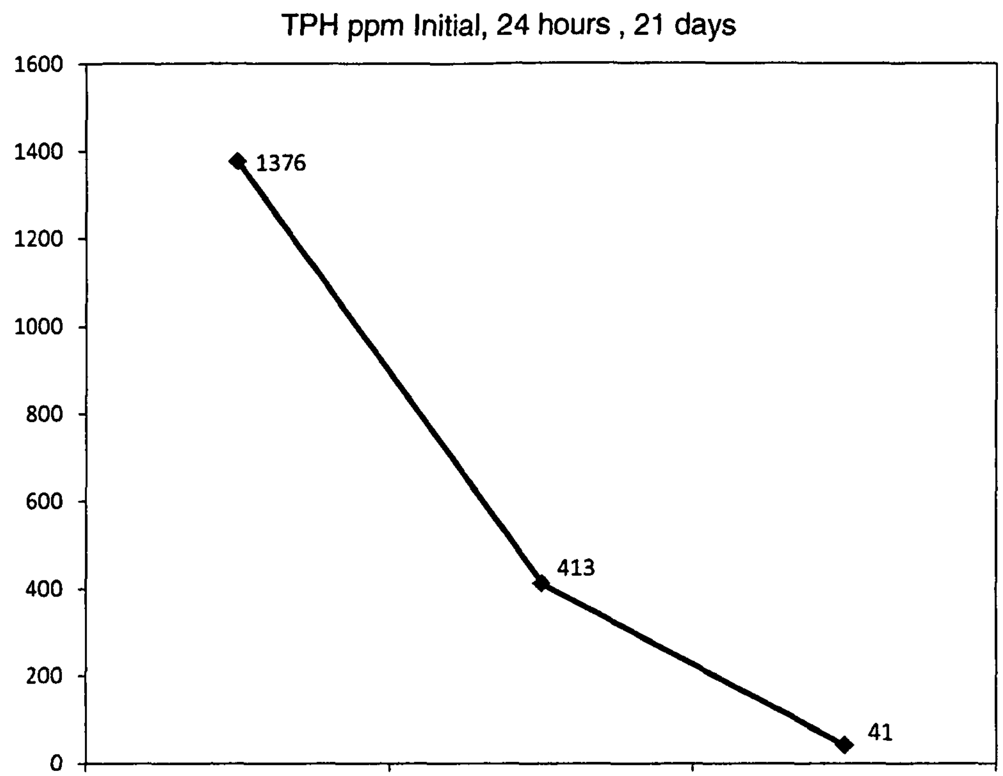
FIG. 1 is a graph showing a reduction of total petroleum hydrocarbons (TPH) in a treated soil sample after 24 hours and after 21 days.

In its most basic form, the remedial composition is a concentrate of a soluble silicate, a surfactant, a polyol and water. These components may be combined by blending about 20 to about 80 wt % soluble silicate, about 0.1 to about 7.0 wt % surfactant, about 0.1 to about 10 wt % polyol, and about 3 to about 78.8 wt % water. Optionally, the weight percent of the water may be reduced to accommodate one or more of the following additives selected from sodium chloride (NaCl), potassium chloride (KCl), magnesium chloride ($MgCl_2$), calcium chloride ($CaCl_2$), hydrogen peroxide ($H_2O_2$), citric acid, capsicum, thymol, oil of oregano, oil of peppermint, and oil of eucalyptus. The concentrated remedial composition may also be further diluted with water in ratios ranging from about 1 part water to about 1 part remedial composition up to and including about 300 parts water to 1 part remedial composition to create a wide variety of cleaners, degreasers and other useful solutions.

The first component of the remedial composition is a soluble silicate. A soluble silicate is an aqueous solution containing a particular mole ratio of silicate to alkali metal oxide. The most common and most widely used soluble silicates are those of sodium or potassium, but it is believed that magnesium, calcium or lithium silicate may also be used to create a suitable remedial composition. For the composition of the present invention it is usually desirable to use a sodium silicate as it is highly effective and fairly economical. However, in certain applications, a potassium silicate may be substituted for the sodium silicate to produce a remedial composition which leaves less of a visible residue upon drying and tends to reduce the potential for scratching certain sensitive or highly polished surfaces being cleaned.

Most commercially available aqueous silicate solutions have about 35% to about 40% dissolved solids content and have a preferred amount of about 38% dissolved solids content as provided by the manufacturer. Unless noted otherwise, it is understood that references herein to "soluble silicates" are to an aqueous silicate solution having about 35% to about 40% dissolved solids content. Accordingly, measured wt % values for soluble silicates will contain about 60% to about 65% water as provided by the manufacturer. Soluble silicates are commercially available in a wide range of mole ratios of silicate to alkali metal oxide, ranging from about 1:1 to about 4:1. For the present invention, it is often desirable to select soluble silicates having a ratio of about 2.6 to about 3.9 moles of $SiO_2$ per mole of $Na_2O$. In one preferred embodiment the soluble silicate will have a ratio of about 3.1 to about 3.3 moles of $SiO_2$ per mole of $Na_2O$. In alternative embodiments using potassium silicate, the desired and preferred mole ratios would remain about the same as those indicated for sodium silicate. The soluble silicates meeting these criteria are particularly well suited for producing a remedial composition and are available from a number of vendors in the United States including Philadelphia Quartz (PQ Corp) and Occidental Chemical (OxyChem). Alternatively, it is believed that suitable soluble silicates may be obtained from Woellner GmbH of Germany, Silmaco NV of Belgium, Shanti Chemical Works of India, YSHC (Tianjin) Chemical of China, and Qindao Silicate Factory of China.

Many commonly used soluble silicates having mole ratios of about 2:1 or less are quite alkaline in nature and have pH values greater than 12.5. These silicates would produce a remedial composition that, while quite effective at treating hydrocarbon waste, would be caustic to human skin and create additional concerns for the environment. It would be a considerable benefit for the remedial composition to not cause additional concerns to fish and wildlife while being used to clean up hazardous waste. By selecting a soluble silicate having a mole ratio of about 2.6 to about 3.9 moles of $SiO_2$ per mole of $Na_2O$, it is possible to produce a remedial composition having a pH value of about 10.0 to about 11.9. Moreover, by using a soluble silicate with a mole ratio of about 3.1 to about 3.3 moles of $SiO_2$ per mole of $Na_2O$, it is possible to produce a composition having a pH value of about 10.5 to about 11.5.

Commercially, sodium silicate solutions having mole ratios of about 2.6 to about 3.9 may be produced by heating $SiO_2$ and $Na_2CO_3$ to about 1400° F., solidifying and then forcing the solids into an aqueous solution while applying great amounts of both heat and pressure. Silicates having these higher mole ratios are more difficult to make soluble in water than those having a lesser ratio of $SiO_2$ per mole of $Na_2O$. These higher ratio materials offer benefits in the remedial composition of the present invention of lower pH values and essentially eliminate the possibility of crystalline silica content in the resulting product. By contrast, the lower ratio materials may contain a measurable percentage of crystalline solids. The amorphous nature of the silicates used in the remedial composition of the present invention are safer for both humans and animals alike. These materials a much more environmentally friendly in both terrestrial and aquatic settings.

Soluble silicates that are selected for higher mole ratio (silicate:alkali metal oxide) values are not just safer to handle and better for the environment, but also seem to provide greater long term cleaning power. By contrast, soluble silicates with mole ratio values of about 2:1 or lower are commonly used as a builder or a reserve to boost alkalinity and to assist other chemical agents in cleaning and degreasing. In the remedial composition of the present invention, soluble silicates with mole ratio values of about 2.6 to about 3.9 actually do the work of cleaning. In treating hydrocarbons, the soluble silicates are believed to attack the C—C bonds form the backbone of long hydrocarbon chains to break them down and form safer organo silicates. In treating heavy metals, the soluble silicates are believed bind to the metal ions to render them relatively non-bioavailable and non-extractable from soil and so forth even with acidic solutions like those commonly used in toxicity characteristic leaching procedures (TCLP testing).

It should also be noted that raw materials to produce soluble silicates may be derived from various sources. The base materials for producing the soluble silica may be mined from the ground, produced via chemical reactions or rendered from plant matter. A few suitable sources of biogenic silica include rice, sugar cane and corn. It is known that the ash produced by burning rice hulls may produce a significant amount of soluble silica with very low levels of impurities. This is shown and described in U.S. Pat. Nos. 5,833,940 and 6,524,543, both issued to Rieber et al. In regard to manufacturing the remedial composition of the present invention, any soluble silica possessing the desired mole ratios and pH values may be utilized without regard to the source of the raw materials. However, it is possible that for certain applications biogenic silica may be particularly desirable either because of its relatively high chemical purity or the availability of rice hulls in many countries like India and China.

The second component of the remedial composition is a surfactant. One basic definition of a surfactant is an organic molecule having both a hydrophilic (water seeking) and a hydrophobic (water repelling) portion. This dual chemical nature makes surfactants particularly useful in laundry detergent and similar applications. Surfactants are commonly used to assist cleaning because the hydrophilic portion seeks out water molecules and tends to stay in solution while the hydrophobic portion seeks out dirt or other solids. Much like laundry detergent, as the aqueous solution containing the surfactant is washed away, it will tend to carry the removed dirt with it. As used in the present invention, the surfactant works at the interface between solid and liquid phases to reduce the surface tension of the liquid and to thoroughly wet the medium to be treated including soil, sand, fly ash, concrete and other materials.

Surfactants are commonly categorized by the type of ionic charge that may be carried by the hydrophilic (water seeking) portion of the molecule. The three types are anionic for a negative charge, cationic for a positive charge, and nonionic for no charge. Anionic surfactants are probably the most commonly used surfactants in commercial applications. These include linear alkyl sulfates, linear alkyl ethoxy sulfates and organo-phosphoric acid esters. Anionic surfactants like these are quite suitable for use in the pollution remedial composition. By contrast, cationic surfactants may work in some limited applications but are generally not desired for use in the remedial composition. However, the preferred surfactants for use in the composition in accordance with the present invention are nonionic. These nonionic surfactants tend to derive their hydrophilic portions from polyhydroxy or polyethoxy structures in the molecule. One particularly preferred nonionic is a glucoside-based surfactant marketed as Videt Q3 available from Vitech International of Milton, Wis.

The third component of the remedial composition is a polyol. The term polyol may be used to refer to a number of chemical compounds including a variety of glycols, glycerins and sugars. Ethylene glycol, also referred to as automotive antifreeze, is one of the most commonly used polyols in the world. Although ethylene glycol may be used to produce a suitable remedial composition, it is also known to be quite toxic to humans and other mammals. The most preferred polyol for use in the remedial composition according to present invention would be propylene glycol, also referred to as pet-safe antifreeze. It is further believed that tripropylene glycol (TPG), glyceryl triacetate or methyl esters of fatty acids would be non-toxic and suitable for use in the present invention.

The forth component of the remedial composition is water. For most applications, this may be ordinary tap water, but it may also be desirable to use de-ionized water (DI water) in some instances. By way of an example, de-ionized water may be better suited for remedial compositions to be used on glass or polished surfaces as it is believed to leave less residue or haze.

It may also be desirable to use water containing a small percentage of dissolved oxygen gas ($O_2$). The percentage of dissolved oxygen may range from about 0.5 wt % to about 15 wt %, preferably about 2 wt % to about 5 wt % for most applications, of the water component blended into the remedial composition. It is believed that even relatively small quantities of dissolved oxygen will serve to make the remedial composition faster acting. This would seem to be particularly true in the treatment of hydrocarbon waste where the additional oxygen radicals present in the solution are believed to assist in breaking the C—C bonds that form the backbone of large hydrocarbon molecules. By way of example, it is believed that the treatment and remediation or an oil stain on a concrete parking lot may be sped up from a 3 to 5 day process to a 1 to day process merely by substituting oxygenated water for tap water in blending the remedial composition.

It is possible to create oxygenated water by a number of different techniques. One possible approach involves simply bubbling oxygen gas ($O_2$) through a container of water. Similarly, it should be possible to oxygenate the water more quickly by bubbling oxygen gas through the water as it is mechanically sheared between two closely spaced rotating surfaces. Another way of creating oxygenated water would involve the use of self-sacrificing electrodes to convert some of the $H_2O$ into small amounts of hydrogen ($H_2$) and oxygen ($O_2$) gas. Yet another way of getting dissolved oxygen into the water would be by employing various chemical components, namely hydrogen peroxide ($H_2O_2$) or sodium peroxide ($Na_2O_2$). By incorporating a small amount, about 1 wt % to about 10 wt %, of a peroxide into the water, it would be possible to quickly and easily create an aqueous solution having the desired amount of dissolved oxygen.

The water is often the final component weighed out for blending the pollution remedial composition and usually comprises the remainder of the concentrate, that is to say whatever wt % is left over after subtracting the wt % total of each of the other components from 100 wt %. It is to be understood the water will complete the remedial composition whether there are just three other components (soluble silicate, surfactant and polyol) or there are additional components present like citric acid, salt, thymol or essential oils.

Of course, this is merely the amount of water added to produce the pollution remedial composition in its most concentrated form. A considerable amount of water may be added later as a dilutent to create a wide array of cleaning and degreasing products for use in both commercial and home applications. The remedial composition as a blended concentrate may be further diluted in ratios ranging from about 1 part water to 1 part remedial composition up to and including about 300 parts water to 1 part remedial composition. By way of example only, it is believed that a dilution of about 10:1 is quite good at cleaning grease, oil and other hydrocarbons from an oven or a gas grill. Another example would be a dilution of about 30:1 for all-purpose cleaning around kitchen or bathroom countertops and floors. One more example would be a dilution of about 60:1 to create a cleaner and degreaser for stainless steel surfaces. Yet another example would be a dilution of about 300:1 for cleaning glass or polished surfaces.

The remedial composition of the present invention is also notable for having very low and usually not detectable volatile organic compound (VOC) content. In many embodiments, the remedial composition will exhibit no measurable VOCs. This is particularly notable because many VOCs have been categorized as carcinogens, asthmagens, neurotoxins, endocrine disruptors and so forth. A growing number of both federal and state governmental agencies have moved to restrict the VOC content allowed in many consumer and commercial products arising from various health and safety concerns. Accordingly, very low and zero VOC products are highly desirable in the new green economy. In fact, there are many cleaning applications like treating the interior of a commercial aircraft wherein the use of zero VOC products would be most desirable. A remedial composition comprising a soluble silicate, a surfactant, a polyol and water in accordance with the present invention qualifies as “zero VOC” according to current guidelines. In fact, the remedial composition of the present invention only contains trace VOC if optional components, namely certain essential oils and the like, are added. If the vapor pressure of a liquid at room temperature is less than 0.1 mm Hg, then that composition qualifies as “zero VOC”.

Another beneficial property of the remedial composition of the present invention is that of fire resistance. It has been observed that by applying a coating of the remedial composition to the surface of an otherwise flammable material and allowing the remedial composition to dry that the resulting residue will provide a coating that is highly resistant to fire. In testing, the remedial composition was sprayed onto the surfaces of wood building materials and allowed to dry completely. These materials were then subjected to the heat of a propylene gas (MAPP gas) cutting torch producing temperatures of up to about 5200° F. The treated wood surfaces were scorched and somewhat blackened by the torch, but the wood did not ignite or continue to burn after the flame was removed.

Referring now to FIGS. 1-11, a number of exemplary treatments of various forms of hazardous waste materials in a number of different environments are shown. It is understood that these test results and graphs are provided only to better illustrate a number of uses for the remedial composition in accordance with the present invention and are in no way limiting in regard to other applications that are not shown here. Unless noted otherwise, the exemplary treatments were carried out using a remedial composition of about 59 wt % of sodium silicate, about 0.5 wt % of nonionic surfactant, about 0.5 wt % propylene glycol, and about 40 wt % water. This remedial composition was then further diluted with about 10 parts water to 1 part remedial composition prior to treatment. The 10:1 diluted remedial composition was then applied at about 2.5 to about 4.8 gallons per ton of contaminated soil, as indicated.

Figure 2:
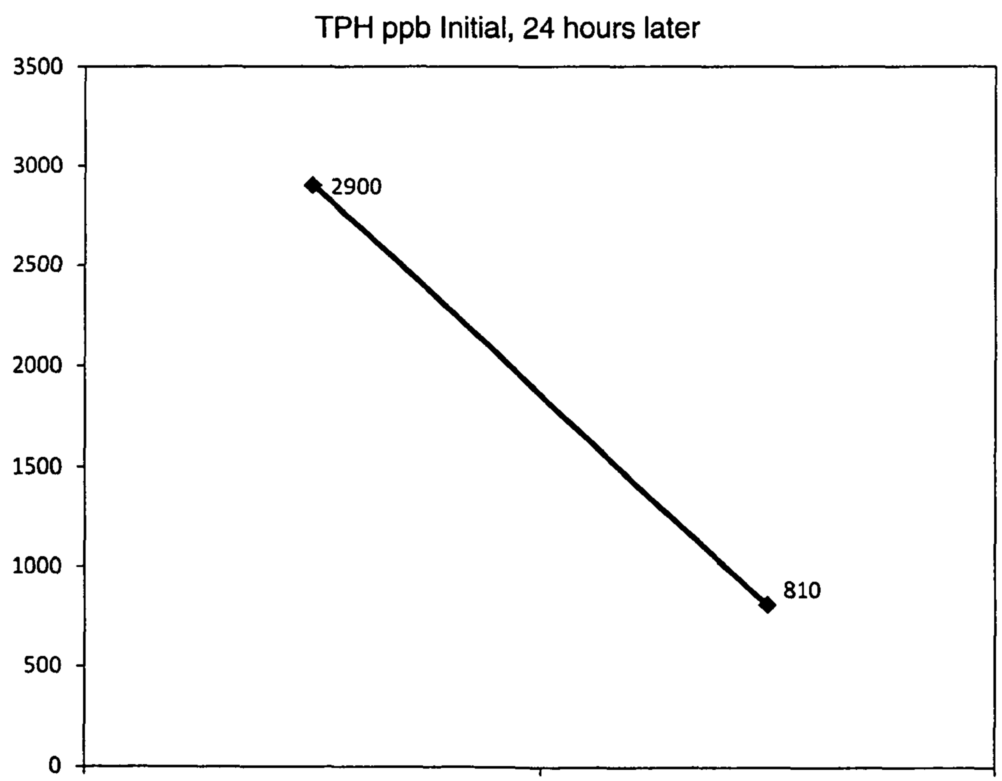
FIG. 2 is a graph showing a reduction of total petroleum hydrocarbons (TPH) in a treated soil sample after 24 hours.
Figure 3:
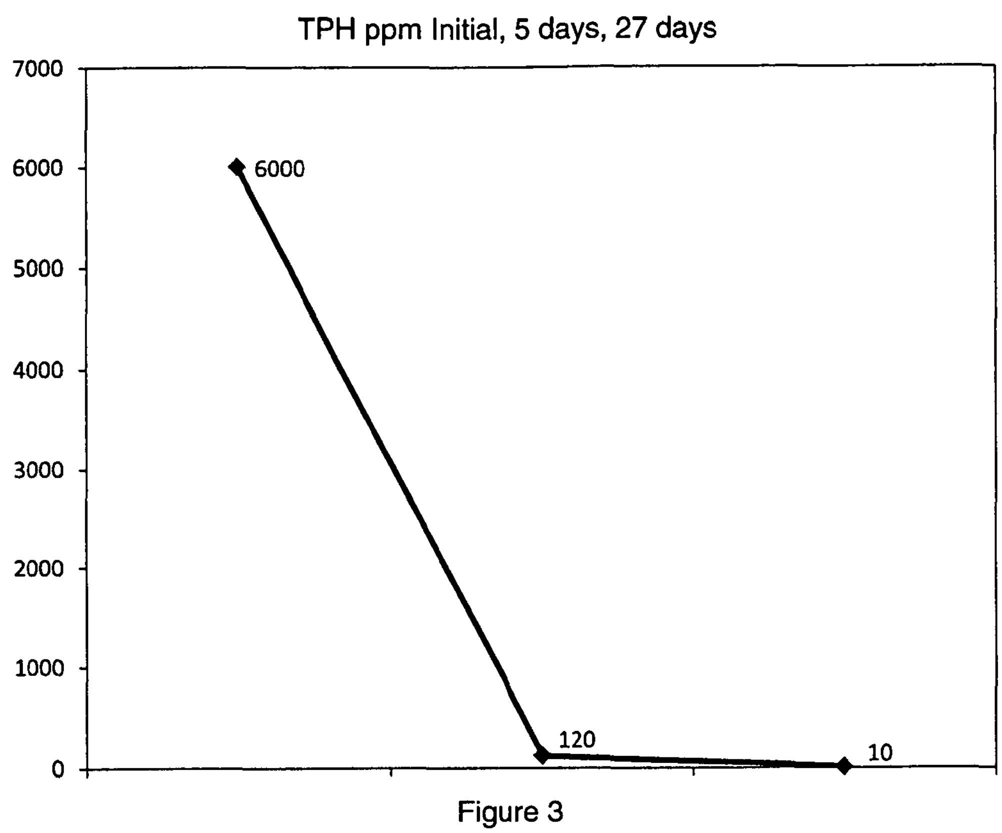
FIG. 3 is a graph showing a reduction of total petroleum hydrocarbons (TPH) in a treated soil sample after 5 days and after 27 days.
Figure 4:
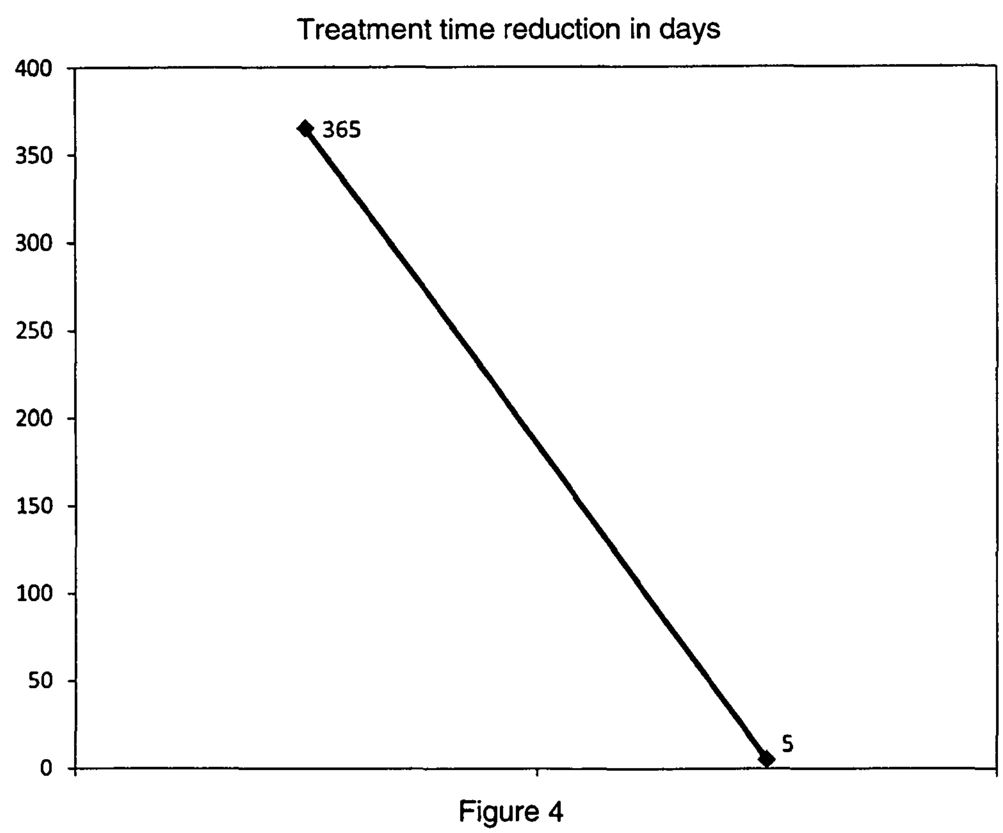
FIG. 4 is a graph showing a reduction in the number of days required to effectively treat a soil sample contaminated with creosote.

Referring now to FIG. 1, contaminated soil was treated with 4.8 gallons of diluted product per ton of soil applied with a pressure sprayer. The initial reduction of total petroleum hydrocarbons (TPH) was about 70% in the first 24 hours and steadily declined from the original levels of 1376 ppm to 41 ppm in three weeks. FIG. 2 illustrates the treatment results of soil contaminated by a crude oil spill. As shown here, the initial TPH readings were about 2900 ppb and were reduced to 810 ppb just 24 hours after spraying of the remedial composition. Turning now to FIG. 3, a contaminated soil sample from a drilling yard is treated with the remedial composition. The average TPH values for the untreated soil were 6000 ppm in about 490 cubic yards of soil. The remedial composition was applied with pressure spraying and in 5 days the average TPH value of the treated soil was between 120 and 138 ppm. The treated soil was allowed to rest for another 22 days and tested again producing average TPH values of about 10 to 23 ppm. Referring now to FIG. 4, soil or sludge contaminated with creosote was treated with the remedial composition and aerated by turning daily for a period of 5 days. Laboratory test results confirmed a reduction of about 77% in lower molecular weight polyaromatic hydrocarbon (PAH) compounds and a reduction of about 20% in higher molecular weight PAH compounds. To achieve similar results with bioremediation would have taken about 9 to 12 months. The notable reduction in treatment time is illustrated here.

Figure 5:
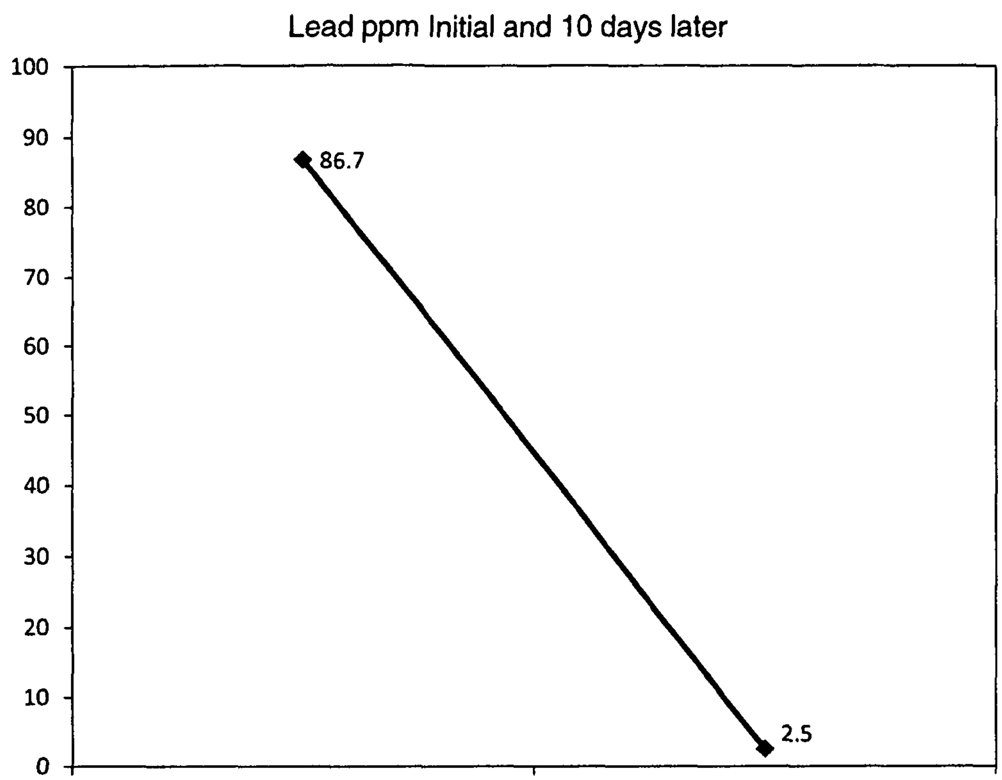
FIG. 5 is a graph showing a reduction of extractable lead (Pb) in a treated soil sample after 10 days.
Figure 6:
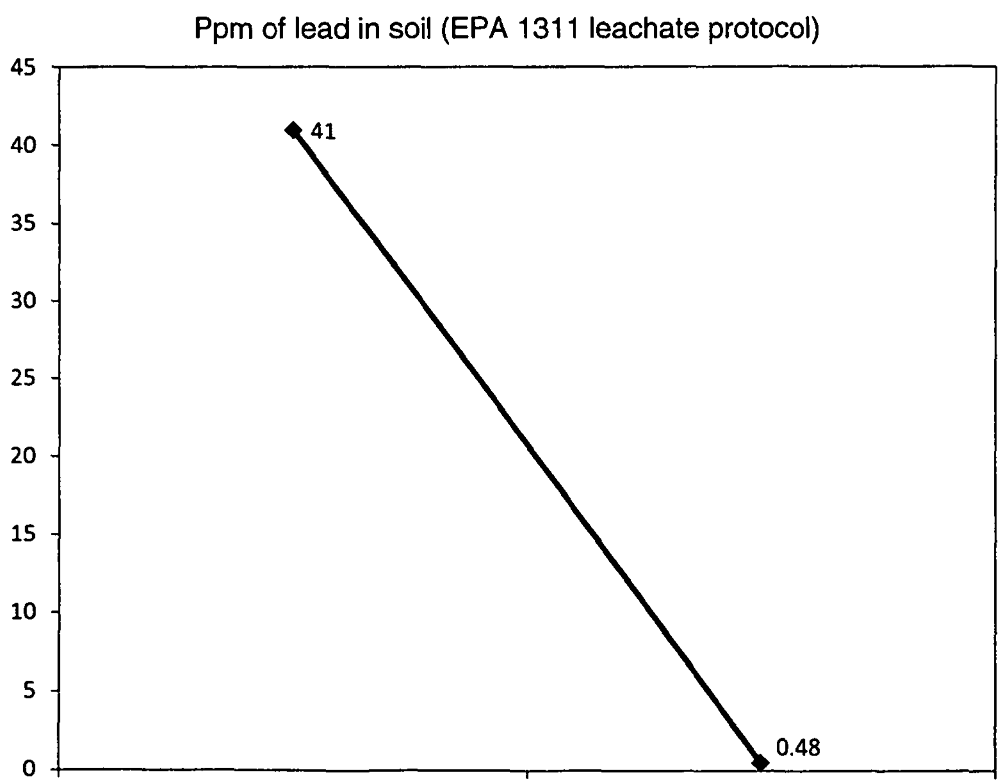
FIG. 6 is a graph showing a reduction of extractable lead (Pb) in a treated soil sample after 14 days.

Shifting focus now from the treatment of hydrocarbons to heavy metals, FIGS. 5-8 illustrate the results of testing the remedial composition on soil for extractable heavy metals including lead (Pb) and cadmium (Cd). FIG. 5 shows the reduction of extractable lead in a contaminated soil sample from 86.7 ppm to 2.5 ppm in just 10 days. These test results are from an independent third party laboratory according to EPA 7420. Although not shown here, a 92.22% reduction in extractable cadmium was also observed in this test sample. Turning now to FIG. 6, another soil sample contaminated with lead was treated with the remedial composition. After resting for two weeks, an extended 18 hour EPA 1311 leachate test was conducted. Extractable lead levels in the soil samples dropped from 41 ppm to 0.48 ppm a reduction of 98.8%.

Figure 7:
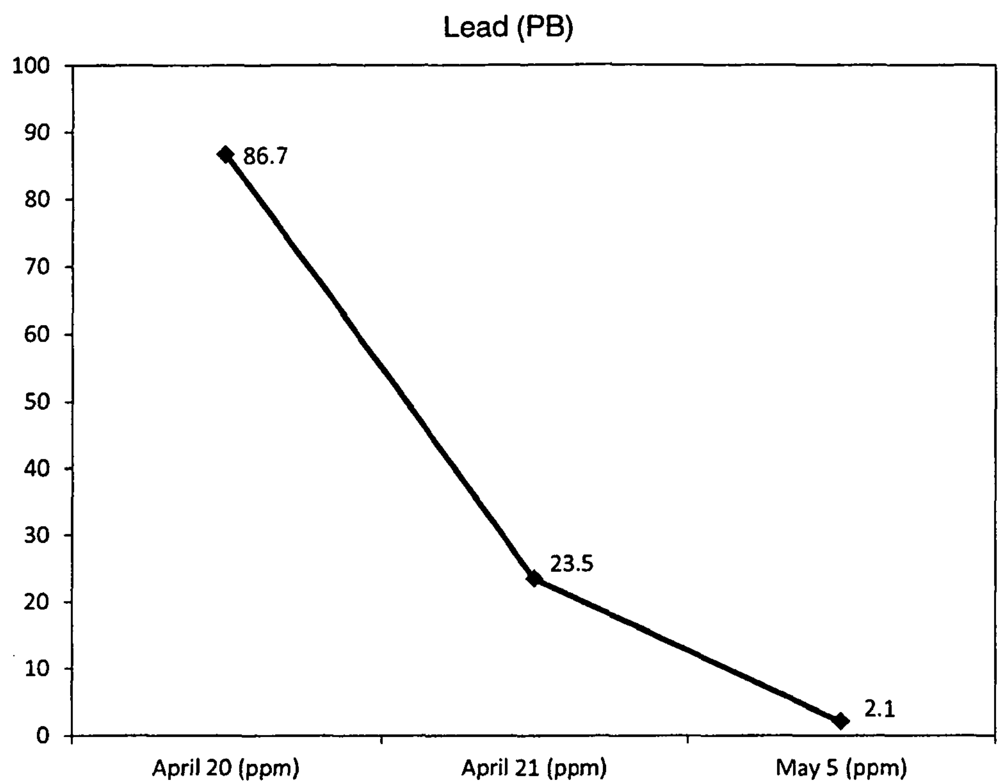
FIG. 7 is a graph showing a reduction of extractable lead (Pb) in a treated soil sample after 24 hours and after 15 days.
Figure 8:
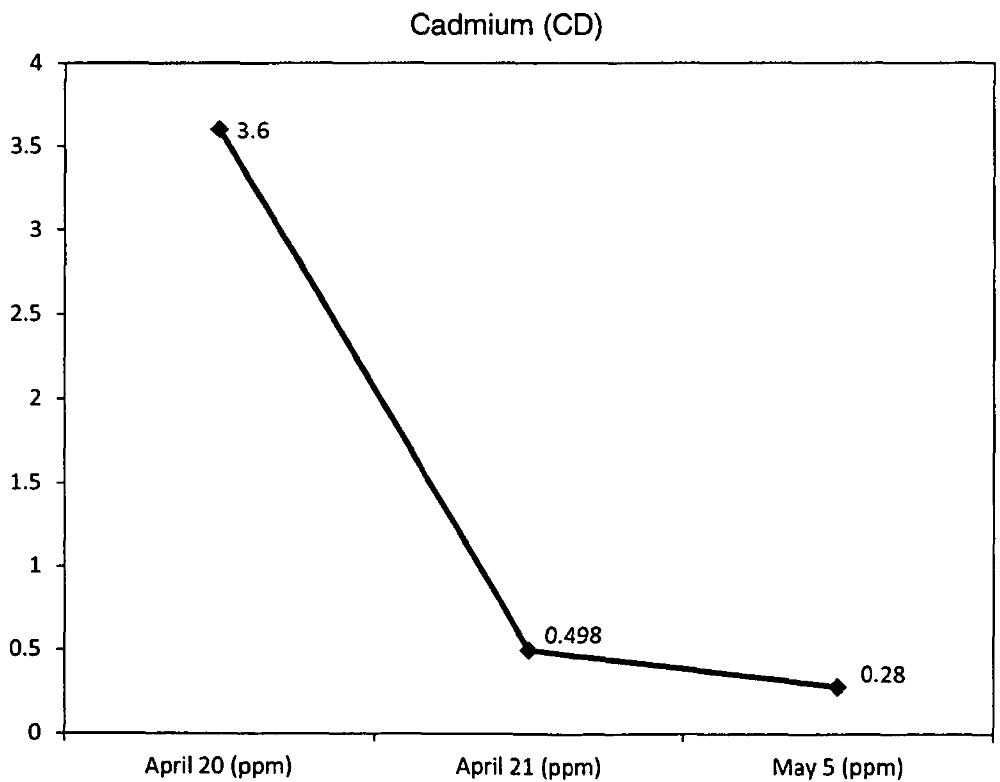
FIG. 8 is a graph showing a reduction of extractable cadmium (Cd) in a treated soil sample after 24 hours and after 15 days.
Figure 9:
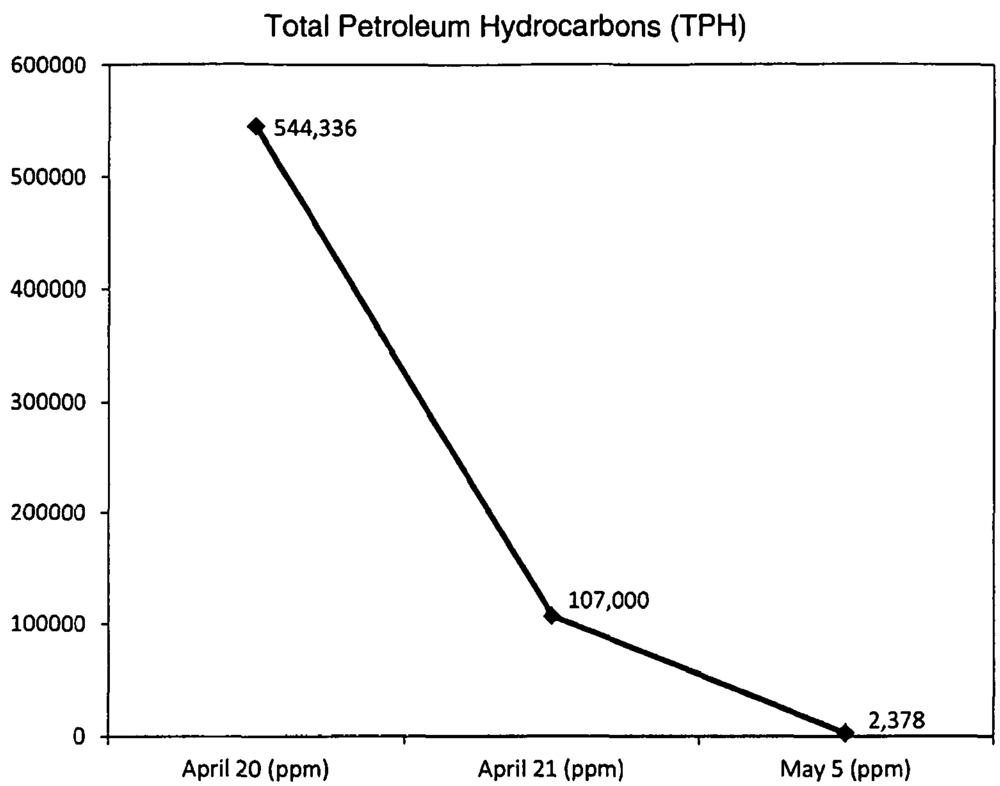
FIG. 9 is a graph showing a reduction of total petroleum hydrocarbons (TPH) in a treated soil sample after 24 hours and after 15 days.

Referring now to FIGS. 7-9, another soil sample was treated with the remedial composition by pressure spraying on day 1 and again on day 7. As shown in FIG. 7, the lead measured via leachate extraction testing dropped from 86.7 ppm to 23.5 ppm in the first 24 hours and dropped to 2.1 ppm after an additional 14 days. FIG. 8 illustrates the reduction in extractable cadmium over the same time periods. The cadmium levels dropped from 3.6 ppm to 0.498 ppm in the first 24 hours and dropped to 0.280 after an additional 14 days. FIG. 9 illustrates the reduction in total petroleum hydrocarbons (TPH) for the soil sample over the same 15 day period. The extractable TPH level dropped from 544, 336 ppm to 107,000 ppm in the first 24 hours and dropped to 2,378 ppm after an additional 14 days.

Figure 10:
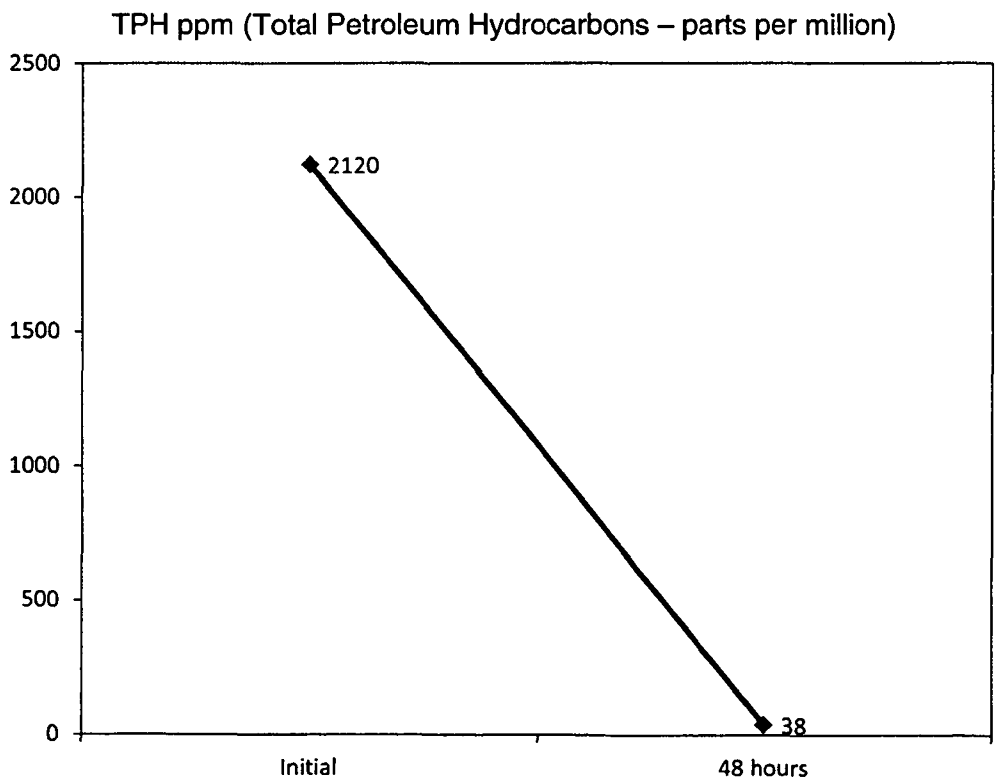
FIG. 10 is a graph showing a reduction of total petroleum hydrocarbons (TPH) in a treated water sample after 48 hours.
Figure 11:
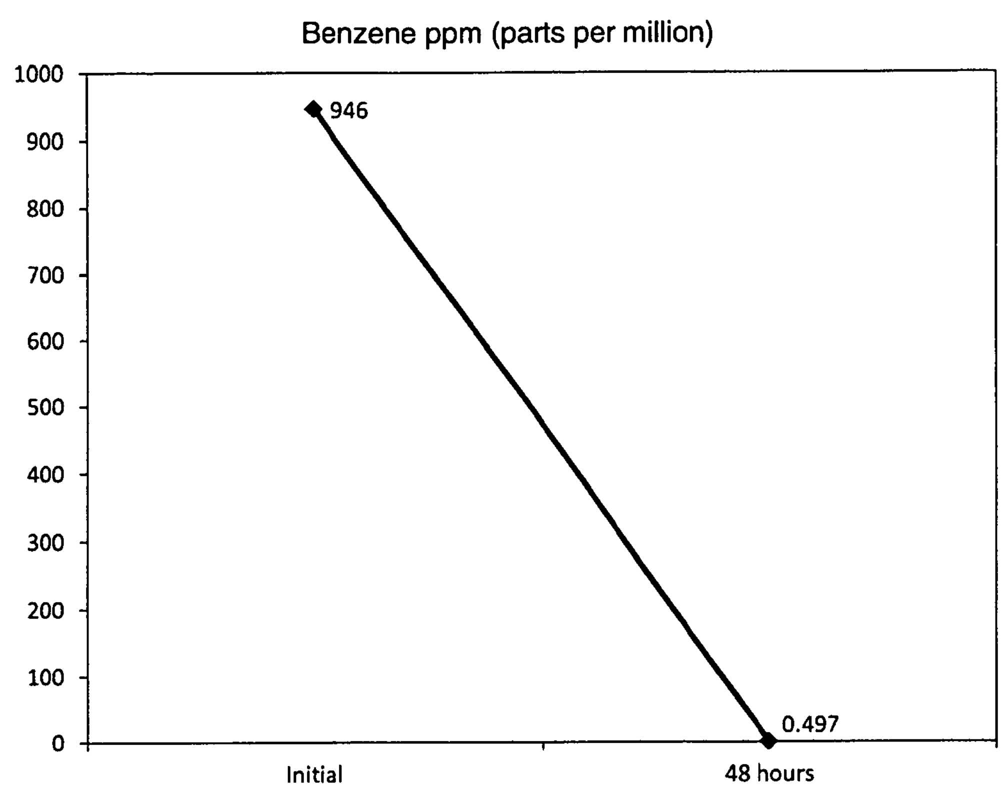
FIG. 11 is a graph showing a reduction of benzene in treated water sample after 48 hours.

Referring now to FIGS. 10 and 11, a contaminated water sample was treated with the remedial composition to reduce both the levels of TPH and benzene. About 21 gallons of 10:1 diluted remedial composition was used to treat about 300 gallons of water, so a treatment of about 7% by volume of remedial composition in the resulting solution. The treated water was agitated for 1 hour, allowed to rest for 2 days, and then tested. These tests produced some rather dramatic results. As shown in FIG. 10, the level of total petroleum hydrocarbons (TPH) was reduced from 2120 ppm to 38 ppm in just 48 hours. Similarly, the level of benzene was reduced from 946 ppm to 0.497 ppm during the same 48 hours.

While a number of preferred embodiments of the invention have been shown and described herein, modifications may be made by one skilled in the art without departing from the spirit and the teachings of the invention. The embodiments described herein are exemplary only, and are not intended to be limiting. Many variations, combinations, and modifications of the invention disclosed herein are possible and are within the scope of the invention. Accordingly, the scope of protection is not limited by the description set out above, but is defined by the claims which follow, that scope including all equivalents of the subject matter of the claims.

What is claimed is:

1. A remedial composition comprising:

from about 20 to about 80 wt % of a soluble silicate;

from about 0.1 to about 7.0 wt % of a surfactant;

from about 0.1 to about 10 wt % of a glyceryl triacetate;

from about 3 to about 78.8 wt % water; and wherein the soluble silicate has a mole ratio of greater than 2.6 moles to about 4.0 moles of silicate per mole of alkali metal oxide.

2. The remedial composition according to claim 1, wherein the soluble silicate is sodium silicate.

3. The remedial composition according to claim 1, wherein the soluble silicate is potassium silicate.

4. The remedial composition according to claim 1, wherein the surfactant is a nonionic surfactant.

5. The remedial composition according to claim 1, wherein the surfactant is a glucoside-based nonionic surfactant.

6. A remedial composition comprising:

from about 20 to about 80 wt % of a soluble silicate;

from about 0.5 to about 7.0 wt % of a surfactant;

from about 0.1 to about 10 wt % of a glycol;

from about 3 to about 78.8 wt % water; and wherein the soluble silicate has a mole ratio of greater than 2.6 moles to about 4.0 moles of silicate per mole of alkali metal oxide.

7. The remedial composition according to claim 6, further comprising one or more of the following additives selected from sodium chloride (NaCl), potassium chloride (KCl), magnesium chloride ($MgCl_2$), calcium chloride ($CaCl_2$), hydrogen peroxide ($H_2O_2$), citric acid, capsicum, thymol, oil of oregano, oil of peppermint, and oil of eucalyptus.

8. The remedial composition according to claim 6, wherein the soluble silicate is sodium silicate.

9. The remedial composition according to claim 6, wherein the soluble silicate is potassium silicate.

10. The remedial composition according to claim 6, wherein the surfactant is a nonionic surfactant.

11. The remedial composition according to claim 6, wherein the surfactant is a glucoside-based nonionic surfactant.

12. The remedial composition according to claim 8, wherein the soluble silicate is derived from biogenic silica.

13. The remedial composition according to claim 6, wherein the composition has a liquid vapor pressure of less than 0.1 mm Hg at room temperature.

14. The remedial composition according to claim 6, wherein the composition is further diluted with water at ratios ranging from about 1:1 to about 300:1 to produce a variety of useful solutions.

15. A remedial composition comprising:

from about 40 to about 80 wt % of a soluble silicate, the soluble silicate being an aqueous solution having about 35% to about 40% dissolved solids content;

from about 0.1 to about 7.0 wt % of a surfactant;

from about 0.1 to about 10 wt % of a glyceryl triacetate; and from about 3 to about 78.8 wt % water.

16. The remedial composition according to claim 15, wherein the soluble silicate is potassium silicate.

17. The remedial composition according to claim 15, wherein the surfactant is a nonionic surfactant.

18. The remedial composition according to claim 15, wherein the surfactant is a glucoside-based nonionic surfactant.

* * * * *